United States Patent [19]
Sasaki

[11] Patent Number: 4,507,692
[45] Date of Patent: Mar. 26, 1985

[54] TAPE CASSETTE

[75] Inventor: Shin Sasaki, Tagajo, Japan

[73] Assignee: Sony Corporation, Tokyo, Japan

[21] Appl. No.: 384,237

[22] Filed: Jun. 2, 1982

[30] Foreign Application Priority Data

Jun. 4, 1981 [JP] Japan ............................. 56-82637[U]

[51] Int. Cl.$^3$ ............................................. G11B 15/04
[52] U.S. Cl. ...................................................... 360/60
[58] Field of Search .................................. 360/60, 132

[56] References Cited

U.S. PATENT DOCUMENTS

| 4,044,386 | 8/1977 | Satou et al. | 360/60 |
| 4,320,421 | 3/1982 | Larson et al. | 360/60 |
| 4,380,030 | 4/1983 | Shiba | 360/60 |
| 4,399,481 | 8/1983 | Loranger et al. | 360/60 |

Primary Examiner—Vincent P. Canney
Attorney, Agent, or Firm—Hill, Van Santen, Steadman & Simpson

[57] ABSTRACT

A tape cassette having a plug for preventing erasure by mistake which may be inserted to make engagement with a recess provided in a peripheral surface of a cassette. The plug has a pair of insertion legs which extend from the ends of a mistake inhibiting web, and engagement portions for engaging mating engagement portions in the engagement recess. The plug may be inserted into the engagement recess from the web side or from the ends of the insertion legs as selected by the user, and the insertion legs will slide along surfaces of the cassette to fill said engagement recess. Different indications may be provided in window openings contiguous to the engagement recess in the cassette proper, according to whether the plug has been inserted from the web side or from the insertion legs, so that the user may know whether the tape cassette is recording correctly or incorrectly.

1 Claim, 13 Drawing Figures

TAPE CASSETTE

BACKGROUND OF THE INVENTION

1. Field of the Invention

This invention relates to a tape cassette and, more particularly, to a tape cassette including a casing or cassette consisting of upper and lower half casing portions integrally connected to each other, and a plug for preventing erasure by mistake which separate from said casing. The plug is insertable in one or another preselected direction into an engagement recess provided in said casing so that the tape cassette may be used for recording or to make erasure impossible depending on the selected direction in which the plug is introduced into the engagement recess.

2. Description of the Prior Art

In many currently used compact type tape cassettes, an opening for preventing erasure by mistake is provided on the back side of a cassette consisting of interconnected upper and lower half portions. A mistake erasure inhibiting tab is implanted on the upper half portion or lower half portion so as to cover said inhibiting opening. A mistake erasure inhibiting pawl is provided in the tape recorder so as to enter said mistake erasure inhibiting opening when the tape cassette is mounted in position in the tape recorder. If desired to prevent the tape cassette from being erased, that is, to protect the magnetic tape against mistaken erasures, the tab is broken off manually to open the mistake erasure inhibiting opening so as to permit the mistake erasure inhibiting pawl to enter said opening to prevent erasures by mistake of the tape cassette.

With such conventional tape cassettes, if it is desired to place the tape cassette in the recording condition after the pawl has already broken off, a piece of tape may be bonded to the opening or the opening may be filled with a suitable pad so that the pawl of the tape recorder may not enter the erasure inhibiting opening.

In such prior art devices, it is not possible to completely fill the mistake erasure inhibiting opening, which can cause erroneous operations. Moreover, the bonded tape pieces or pads may occasionally enter the inside of the tape recorder thus causing malfunctions of the device. In addition, for certain types of the materials of the cassette, breaking off of the projection may involve considerable labor and cause operational difficulties.

In tape cassettes used as recording mediums for e.g. an electronic computer, it is also known to use a U-shaped mistake erasure inhibiting plug that may be introduced into a mistake erasure inhibiting opening provided in the cassette. By selecting the direction in which the plug is introduced into the erasure inhibiting opening it may be opened or closed so as to make tape cassette recording possible or impossible.

Such erasure inhibiting devices involve certain inconveniences in that the erasure inhibiting opening is provided in the normally invisible back side of the cassette so that the user may not realize instantly whether or not the tape cassette is recording correctly. Especially, when the tape cassette is mounted to the tape recorder, the back side of the tape cassette is completely buried in the tape recorder and hidden from the user's view. Hence, whenever the tape cassette is used, it may be necessary to remove the tape cassette from the tape recorder in order to check whether the tape cassette can be used for recording or not, thus resulting in inconvenience during operation.

SUMMARY OF THE INVENTION

It is therefore an object of the present invention to provide a tape cassette free of these shortcomings of the prior art device.

It is another object of the present invention to provide a tape cassette wherein the tape cassette may be fixed so it can be recorded or so it cannot be recorded depending on the selected directions in which the mistake erasure inhibiting plug is inserted into the engagement recess provided in the cassette.

It is another object of the present invention to provide a tape cassette wherein the recording or not recording conditions of the tape cassette may be checked with the mistake erasure inhibiting plug mounted on the cassette.

It is another object of the present invention to provide a tape cassette wherein the recording or not recording state may be indicated by providing different indications in the window openings in the cassette depending on the directions in which the mistake erasure inhibiting plug is inserted into the mistake erasure inhibiting opening.

It is still another object of the present invention to provide a tape cassette wherein the plug may be accurately positioned in and positively engaged with the engagement recess in the cassette proper when the plug is introduced into the engagement recess.

Other objects of the present invention will become apparent from the following description and the accompanying drawings.

DESCRIPTION OF THE PREFERRED EMBODIMENTS

Figure 1:
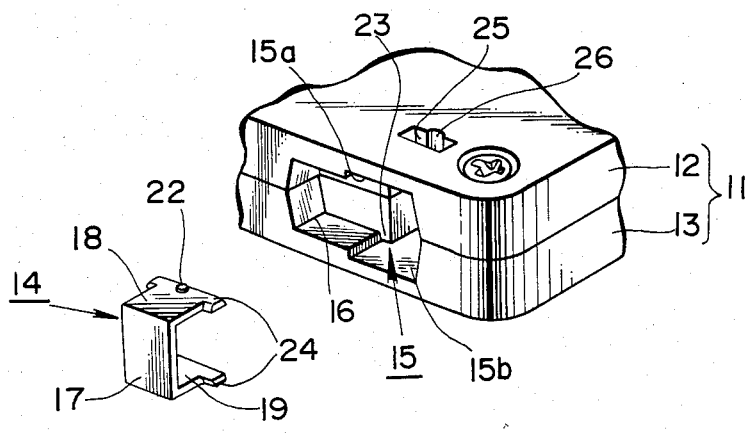
FIG. 1 is a partial exploded perspective view showing an embodiment of the present invention.

The tape cassette of the present invention is formed by a casing or tape cassette 11 composed of an upper half casing portion 12 and a lower half casing portion 13 conventionally connected integrally to each other. The casing has a pair of tape reels on which is wound a magnetic tape. On the back surface of the tape cassette 11, that is, on the surface opposite to the front surface which has an opening for accommodating the magnetic head of the tape recorder, there is provided, as shown in FIG. 1, an engagement recess 15 into which a mistake erasure inhibiting plug 14 made of cast synthetic material may enter or a mistake erasure inhibiting pawl which mounted on the tape recorder may enter. In the present embodiment, there is provided a detection opening 16 contiguous to the engagement recess 15 for allowing the detection of the kind of tape stored in the cassette proper 11.

Figure 2:
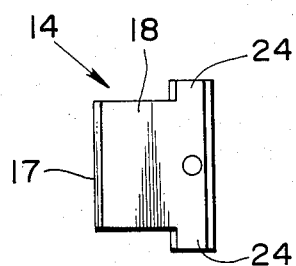
FIG. 2 is a plan view of the mistake erasure inhibiting plug.
Figure 3:
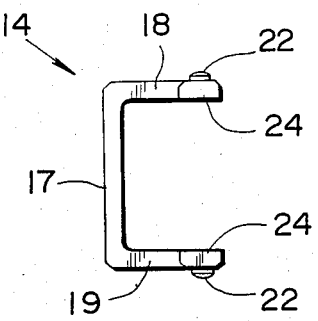
FIG. 3 is a side elevation of the same.
Figure 4:
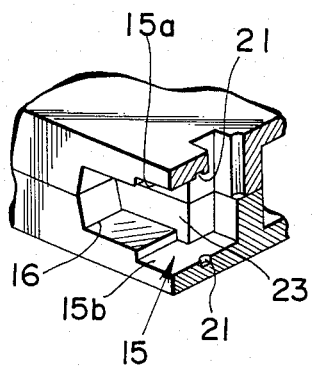
FIG. 4 is a partial perspective view of the cassette proper shown insection for illustrating an engagement recess.

The plug 14 is adapted to be inserted into and engaged in the engagement recess 15 and is U-shaped and has a web 17 and a pair of confronting insertion legs 18, 19 which extend from the ends of the web 17, as shown in FIGS. 2 and 3. The outer surfaces of the insertion legs 18, 19 are formed with a pair of projections 22, 22 adapted to be engaged in recesses 21, 21 formed in wall surfaces defining the engagement recess 15, when the plug 14 is inserted into the engagement recess 15. As shown in FIG. 3, the ends of the insertion legs 18, 19 are formed with positioning or stopper projections 24, 24 that engage a stepped portion 23 of the engagement recess 15.

The U-shaped plug 14 and the engagement recess 15 are designed with mating configurations such that the plug 14 may be inserted into the engagement recess 15 only when the insertion legs 18 and 19 are guided along the upper and lower walls 15a, 15b of the engagement recess 15 of the cassette 11, and the plug 14 may be inserted into the engagement recess 15 with the web 17 first or with the ends of the insertion legs 18, 19 first, as selected by the user.

Figure 5A:
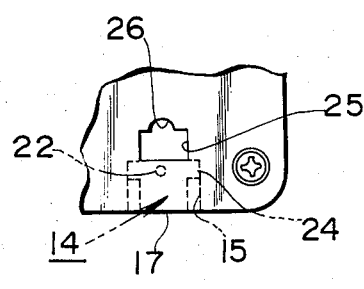
FIG. 5A is a partial plan view showing the mistake erasure inhibiting plug introduced from the side of the insertion legs.
Figure 5B:
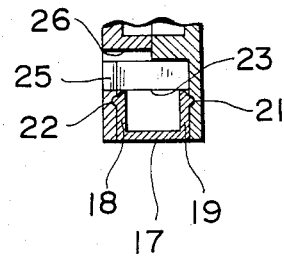
FIG. 5B is a partial sectional view showing the mistake erasure inhibiting plug introduced from the side of the insertion legs.

When the plug 14 is inserted into the engagement recess 15 with the insertion legs 18, 19 first, and the web 17 facing towards the outside of the engagement recess 15, the stopper projections 24, 24 engage in the stepped portion 23, so that the plug is received and held in the engagement recess 15, as shown in FIGS. 5A and B. When the plug 14 is inserted in this way so that the engagement recess 15 is closed by the web 17, the plug 14 is positioned by the step portion 23 and held halfway into the engagement recess 15, so that a window opening 25 which is provided in the cassette proper 11 contiguous to and communicating with the innermost zone of the engagement recess 15 remains open. The purpose of the window opening 25 is to allow the user to readily check whether the tape cassette is in a record position or in a record preventing position. The window opening 25 remains open and indicates if the plug 14 has closed the engagement recess 15 and whether the tape cassette is in a record condition.

Figure 6A:
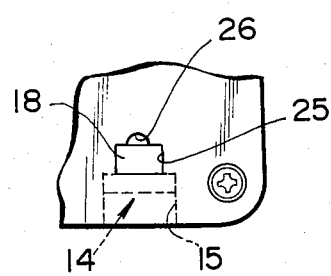
FIG. 6A is a partial plan view showing the mistake erasure inhibiting plug introduced from the side of the web.
Figure 6B:
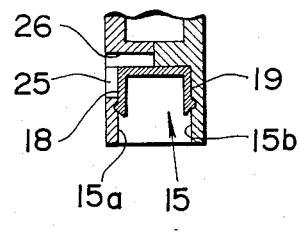
FIG. 6B is a partial sectional view showing the mistake erasure inhibiting plug introduced from the side of the web.

On the other hand, if the direction of the plug is turned 180° relative to the above example before insertion and the plug 14 engages the engagement recess 15 with the side of the web 17 leading, the plug 14 will no longer be retained by the step portion 23 but may be inserted fully into the engagement recess 15, as shown in FIGS. 6A and B. With the plug 14 inserted in this manner into the engagement recess 15, the recess 15 is in the open state, that is, the mistake erasure inhibiting pawl may enter the recess 15 and will prevent tape erasure by mistake. At this time, a portion of the insertion legs 18 or 19 registers with the window opening 25. With the portion of the legs 18 or 19 thus in register with the window opening 25, it is indicated that the engagement recess 25 is in the open position, that is, the tape cassette is in the erasure prevented or in the record prevent condition.

It is to be noted that more positive indication may be obtained by coloring the plug 14 with a color different from the main portion of the cassette 11. Alternatively, an indication that recording is not feasible may be provided by the portions of the insertion legs 18, 19 that register with the window opening 25.

When the mistake erasure inhibiting plug 14 is inserted with the web side leading as shown in FIGS. 6A and B, the plug 14 may be embedded in the recess 15 and thus it may be difficult to extract. In order to facilitate extraction, a groove 26 may be provided in the innermost wall surface of the recess 15 so that a tool such as screwdriver may be inserted into the groove through the window opening 25 of the cassette 11.

Figure 7:
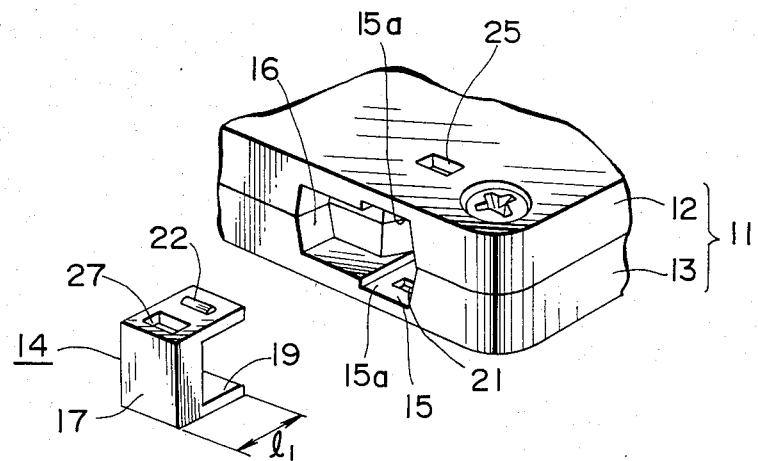
FIG. 7 is a partial exploded perspective view showing a modified embodiment of the present invention.

FIG. 7 shows a modified embodiment of the present invention. The mistake erasure inhibiting plug 14 of this embodiment has a length $l_1$ of the insertion legs 18, 19 which is equal to the depth $d_1$ of the engagement recess 15. A pair of through-holes 27, 27 are provided in positions to register with window openings 25, 25 in the cassette 11 when the plug is inserted into the engagement recess 15 with the web side leading.

With such plug 14, the stopper projections 24, 24 and the step portion 23 of the preceding embodiment may be eliminated.

Figure 8A:
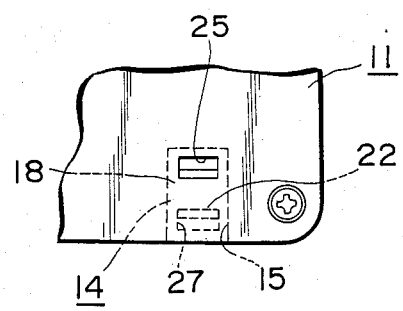
FIG. 8A is a partial plan view showing the mistake erasure inhibiting plug introduced from the side of the insertion legs.
Figure 8B:
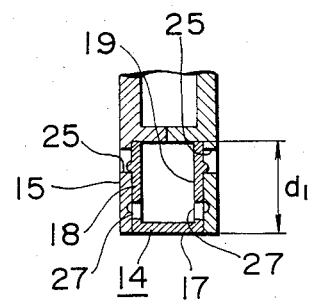
FIG. 8B is a partial sectional view showing the mistake erasure inhibiting plug introduced from the side of the insertion legs.

When the plug 14 is inserted into the recess 15 with the ends of the insertion legs 18, 19 leading so that the engagement recess 15 is closed by the web 17, part of the surface of insertion legs 18, 19 may register with the window openings 25, while the engagement projections 22, 22 are engaged in the window openings 25, 25, as shown in FIGS. 8A and B, thus indicating that the tape cassette can be used for recording.

Figure 9A:
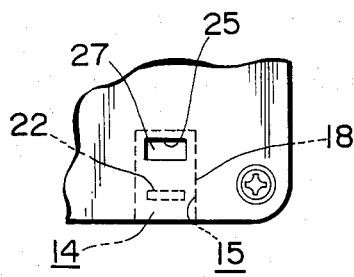
FIG. 9A is a partial plan view showig the mistake erasure inhibiting plug introduced from the side of the web.
Figure 9B:
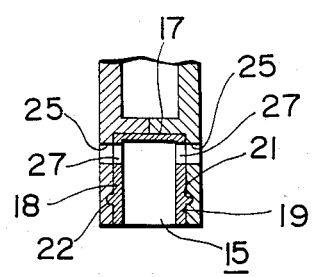
FIG. 9B is a partial sectional view showing the mistake erasure inhibiting plug introduced from the side of the web.

On the contrary, when the direction of plug insertion is turned 180° and the plug 14 inserted with the web 17 leading which allows the engagement recess 15 to be visible, the through-holes 27 in the insertion legs 18, 19 register with the window openings 25, as shown in FIGS. 9A and B, thus indicating that the tape cassette cannot be used for recording.

It is seen that this invention is simple and provides inexpensive means for allowing a tape cassette to be placed in the record or in the record preventing condition. The device is simple to use and is fail safe.

Although the invention has been described with respect to preferred embodiments, it is not to be so limited as changes and modifications can be made which are within the full intended scope of the invention as defined by the appended claims.

I claim as my invention:

1. A tape cassette comprising a cassette formed with an upper half portion and a lower half portion which are integrally connected together, a magnetic tape wound on a pair of mounting reels which are rotatably mounted in the cassette, a mistake erasure inhibiting plug insertable into and engageable with an engagement recess provided in one side face of said cassette, said mistake erasure inhibiting plug having a central web and a pair of insertion legs which extend from the ends of said central web and also has an engagement portion for engaging mating engagement portions provided in said engagement recess, said plug receivable into said engagement recess in either of two selectable positions with the web leading or with the insertion legs leading, said insertion legs sliding along surfaces of the cassette to close said engagement recess, said engagement portions engaging with mating engagement portions in the engagement recess of the cassette and comprising engagement projections mounted on the outer surfaces of said insertion legs at central locations of said mistake erasure inhibiting plug, and means provided for indicating in a window opening in the cassette contiguous to, said engagement recess whether the plug has been inserted with the web side leading or with the legs leading to show whether the tape cassette can be used for recording or not, and wherein positioning or stopper projections are provided on either side of the end portions of said insertion legs, said projections engaging a stepped portion in said engagement recess of the cassette for controlling the amount of insertion of said erasure inhibiting plug into said engagement recess.

* * * * *